No. 790,469.

Patented May 23, 1905.

UNITED STATES PATENT OFFICE.

HENRY V. WALKER, OF BROOKLYN, NEW YORK.

COMPOUND FOR FUMIGATING PURPOSES.

SPECIFICATION forming part of Letters Patent No. 790,469, dated May 23, 1905.

Original application filed October 12, 1904, Serial No. 228,189. Divided and this application filed March 6, 1905. Serial No. 248,547.

*To all whom it may concern:*

Be it known that I, HENRY V. WALKER, a citizen of the United States, residing in Brooklyn, Kings county, State of New York, have invented a certain new and useful Improvement in Compounds for Fumigating Purposes, of which the following is a specification.

It is well known that formaldehyde-gas is highly effective in destroying disease-germs, and substances capable of evolving formaldehyde are largely used for deodorizing and disinfecting purposes.

The most ordinary method employed for producing formaldehyde gas for disinfection involves the use of a solid polymerized formaldehyde which is subjected to the heat of burning fuel, so as to drive it off in a gaseous state. This method is subject to a number of disadvantages, among which may be mentioned danger from leaving a fire burning in a closed apartment and frequent ignition of the paraform or polymerized formaldehyde. This process is, moreover, a slow one and produces an uncertain output of gas in any given case.

It is the object of the present invention to provide an improved means for producing formaldehyde gas in the location where needed, while avoiding the above inconveniences and dangers.

Briefly stated, the manufacture of my compound involves simply dissolving formaldehyde in water with an auxiliary reagent having the qualities hereinafter described for the production of a fumigating agent, and then I accomplish the required fumigation by chemically separating the formaldehyde under circumstances productive of sufficient internal heat to transform the polymerized material (when present) into gaseous formaldehyde.

It has been heretofore proposed to cause lime to react upon a solution of formaldehyde or upon polymerized formaldehyde in water for the purpose of producing formaldehyde gas for disinfection. My present invention is based primarily upon this idea of causing lime to act upon a solvent containing formaldehyde; but the present invention involves a greatly-improved process, whereby the maximum of the formaldehyde used is rendered available for fumigating purposes and whereby, while not acting too rapidly, the disengagement of formaldehyde gas is nevertheless sufficiently rapid, so that the best results are attained in a short time.

The process hereinafter described is claimed in my pending application for patent, Serial No. 228,189, filed October 12, 1904, of which this application, which only claims the compound to be used in carrying out said process, is a division.

My improved process may be carried out in a variety of ways. In following out one modification of my process I proceed as follows: I dissolve formaldehyde in water, preferably in substantially the proportions found in the solution commonly known as "formaline." To this I add sulfuric acid (about 66 Baumé) in the proportion of about one or two of acid to six of formaline. The compound thus formed may be used as the fumigating agent and is preferably treated for fumigating purposes as follows: In the apartment to be fumigated I place in a suitable vessel a sufficient amount of quicklime (CaO) to unite with all of the solvent in my liquid. Upon this lime, preferably in small lumps, I pour the above-described compound of formaline and sulfuric acid and leave the same in the suitably-sealed apartment. One advantage of this method is that the reaction does not begin at once, and the user has plenty of time to seal and leave the apartment without danger of inhaling the formaldehyde fumes. At the same time when it does commence the reaction is very rapid, and I can thoroughly fumigate an apartment by this method in half the time or less than is occupied in the ordinary fumigation by use of burning fuel.

Some of the advantages of the above process are as follows: No special apparatus is required. There is no danger of fire. The use of exactly the right amount of disinfectant is facilitated. The process is very inexpensive and takes much less time than former processes.

The fumigating compound which I have described above should not be allowed to stand very long before use, as the sulfuric acid tends to change the formaldehyde in solution into paraform, which forms a crust on the inside of the bottle. It is of course within the scope of my invention to produce the mixture at the time the same is used.

While the compound above described is capable of producing excellent results, I prefer to employ a compound wherein the sulfuric acid is replaced by aluminium sulfate. In using aluminium sulfate I make a saturated solution of this salt in the formaline, which solution constitutes the fumigating agent. In carrying out the fumigation I have found that six or seven ounces of the fumigating agent poured upon twelve to sixteen ounces of quicklime will produce excellent results. My invention is not limited to these proportions, however.

Where sulfate of alumina is used, another method of proceeding can be adopted with excellent results. The fumigating agent can be made by dissolving from five to seven ounces of sulfate in eight fluid ounces of hot water. The solution thus prepared is then mixed with about twenty-five ounces of forty-per-cent. formaldehyde solution.

It should be remembered that in using sulfate of alumina a quick-slaking lime should be used for the best results. In using sulfuric acid instead of a salt the quick slaking of the lime is not so essential.

The sulfuric acid and aluminium sulfate are merely examples of reagents which may be employed in carrying out my invention, and it is to be understood that my claims cover equivalent substances used substantially as above described and having the characteristics hereinafter described.

I have found that if formaline be simply added to quicklime without any other reagent the hydroxid of lime resulting from the action of the water on the quicklime is to a considerable extent dissolved in water, and in this condition of solution the hydroxid reacts upon the formaldehyde in the formation of inactive compounds, thus greatly diminishing the volume of gas obtained and decreasing the efficiency of the process. My invention therefore contemplates the use of a compound or mixture containing a reagent which will prevent the hydroxid of lime from going into solution and will produce in its reaction upon the lime no substance capable of injurious reaction upon formaldehyde. Sulfuric acid in dilute form, which may be classed as a sulfate of hydrogen, when employed in the manner above described is one of the agents which answers this description, and aluminium sulfate is another. I prefer to use aluminium sulfate, for the reason that the solution can be kept for a long time without any appreciable polymerizing of the formaldehyde. In this respect aluminium sulfate is superior to dilute sulfuric acid.

In carrying out my process as above described I do not so much depend on the use of a substance evolving heat in contact with water as I do on the use of one which combines chemically with the water, so as to free the formaldehyde. By the older proposed method above mentioned the heat of only 212° Fahrenheit is attained, and this is not sufficient to transform all the polymerized formaldehyde into gas. By my process, on the contrary, I obtain a much higher temperature, sometimes as high as 400° Fahrenheit, whereby all the gas available is obtained.

While I have described formaldehyde as used in the manner stated, it is to be understood that my invention is applicable also in connection with any of the closely-allied substances which can be transformed by moderate heat for disinfecting purposes. It is therefore to be understood that the term "formaldehyde" as used in my claims covers both the gas and its polymerized forms.

It is not essential that actual solution of the formaldehyde-producing substances in water should take place, since the heat evolved by my process is capable of producing formaldehyde gas from insoluble paraform.

What I claim is—

1. A fumigating agent containing formaldehyde, water and a reagent tending to prevent hydroxid of lime from dissolving in water and incapable of forming, by reaction with said lime, a substance which reacts unfavorably upon formaldehyde, substantially as described.

2. A fumigating agent, composed of an aqueous solution of formaldehyde with a reagent tending to prevent hydroxid of lime from dissolving in water and incapable of forming, by reaction with said lime, a substance which reacts unfavorably upon formaldehyde, substantially as described.

3. The composition of matter above described, composed of an aqueous solution of formaldehyde mixed with a suitable sulfate, substantially as described.

4. The composition of matter above described, composed of an aqueous solution of formaldehyde mixed with aluminium sulfate, substantially as described.

HENRY V. WALKER.

Witnesses:
H. S. MacKaye,
Florence S. Pick.